US010027573B2

(12) United States Patent
Shaw et al.

(10) Patent No.: US 10,027,573 B2
(45) Date of Patent: Jul. 17, 2018

(54) CENTRALIZED RADIO ACCESS NETWORK VIRTUALIZATION MECHANISM

(71) Applicant: AT&T Intellectual Property I, L.P., Atlanta, GA (US)

(72) Inventors: Venson Shaw, Kirkland, WA (US); Jin He, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 242 days.

(21) Appl. No.: 14/511,594

(22) Filed: Oct. 10, 2014

(65) Prior Publication Data
US 2016/0105355 A1 Apr. 14, 2016

(51) Int. Cl.
*G06F 15/16* (2006.01)
*H04L 12/707* (2013.01)
(Continued)

(52) U.S. Cl.
CPC ............. *H04L 45/22* (2013.01); *H04L 47/76* (2013.01); *H04L 67/18* (2013.01); *H04L 67/22* (2013.01);
(Continued)

(58) Field of Classification Search
CPC ... H04W 84/12; H04W 88/06; H04W 88/085; H04W 88/08; H04W 28/02; H04W 24/02;
(Continued)

(56) References Cited

U.S. PATENT DOCUMENTS 7,594,113 B2 * 9/2009 Tan ..................... H04L 63/0414
713/169
8,429,630 B2   4/2013 Nickolov et al.
(Continued)

FOREIGN PATENT DOCUMENTS

EP   2316071       5/2011
EP   2611085 A1    3/2013
(Continued)

OTHER PUBLICATIONS

Cáceres, Ramón, et al. "Virtual individual servers as privacy-preserving proxies for mobile devices." Proceedings of the 1st ACM workshop on Networking, systems, and applications for mobile handhelds. ACM, 2009.*
(Continued)

*Primary Examiner* — Mohamed Ibrahim
(74) *Attorney, Agent, or Firm* — Amin, Turocy & Watson, LLP

(57) ABSTRACT

Diverting communication content directed to a wireless device based on a determined state of a display of the wireless device is presented herein. A method can include receiving state information representing a display state of a display of a wireless device; and in response to determining, based on the state information, that the display has been inactive for a defined period of time, redirecting communication content that has been directed to the wireless device to an intermediary device. In an example, the redirecting can include storing the communication content in the intermediary device as stored content, and in response to determining, based on the state information, that the display has been active, sending, via the intermediary device, the stored content directed to the wireless device.

20 Claims, 14 Drawing Sheets

(51) Int. Cl.
*H04L 29/08* (2006.01)
*H04L 29/06* (2006.01)
*H04W 40/34* (2009.01)
*H04L 12/917* (2013.01)

(52) U.S. Cl.
CPC .......... *H04L 67/2814* (2013.01); *H04L 69/04* (2013.01); *H04W 40/34* (2013.01)

(58) Field of Classification Search
CPC ...... H04W 72/042; H04L 67/10; H04L 67/22; H04L 51/38; H04L 45/22; H04L 5/0035; H04L 5/0037; H04L 5/0032; H04L 5/0073; H04M 2207/18
USPC ........ 709/203, 217, 224, 227, 219; 370/329, 370/328, 252
See application file for complete search history.

(56) References Cited

U.S. PATENT DOCUMENTS

| | | | |
|---|---|---|---|
| 8,588,764 | B1 | 11/2013 | Koller et al. |
| 8,745,267 | B2 | 6/2014 | Luecke et al. |
| 8,761,101 | B1 | 6/2014 | Crosbie et al. |
| 8,775,535 | B2 | 7/2014 | Hugg et al. |
| 8,848,608 | B1* | 9/2014 | Addepalli ............. H04W 4/046 370/328 |
| 2006/0223593 | A1* | 10/2006 | Ishak ................ H04L 29/06027 455/574 |
| 2010/0057872 | A1 | 3/2010 | Koons et al. |
| 2010/0081440 | A1* | 4/2010 | Reddy .................. H04W 88/02 455/450 |
| 2012/0284638 | A1 | 11/2012 | Cutler et al. |
| 2013/0040669 | A1 | 2/2013 | Bengtsson et al. |
| 2013/0042275 | A1 | 2/2013 | Payette et al. |
| 2013/0097309 | A1* | 4/2013 | Ma .................... H04L 29/08099 709/224 |
| 2013/0163513 | A1* | 6/2013 | Park ..................... H04L 67/148 370/328 |
| 2013/0303203 | A1 | 11/2013 | Wang et al. |
| 2013/0346543 | A1* | 12/2013 | Benantar ............... G06F 9/5055 709/217 |
| 2014/0007222 | A1* | 1/2014 | Qureshi .................. G06F 21/10 726/16 |
| 2014/0050103 | A1* | 2/2014 | Niu ......................... H04L 43/08 370/252 |
| 2014/0064058 | A1* | 3/2014 | Agrawal ............... H04W 28/12 370/221 |
| 2014/0086177 | A1 | 3/2014 | Adjakple et al. |
| 2014/0204412 | A1 | 7/2014 | Pizot et al. |
| 2014/0295913 | A1* | 10/2014 | Gupta ................. H04W 40/244 455/552.1 |
| 2014/0310386 | A1* | 10/2014 | Srinivasan ............ H04L 65/605 709/219 |
| 2014/0310709 | A1* | 10/2014 | Nirantar .................. G06F 9/485 718/1 |
| 2015/0142946 | A1* | 5/2015 | Alam .................. H04L 43/0876 709/224 |
| 2015/0256586 | A1* | 9/2015 | Bragstad ................ H04L 43/16 709/219 |
| 2016/0301598 | A1* | 10/2016 | Strijkers ................. H04L 67/34 |

FOREIGN PATENT DOCUMENTS

| | | |
|---|---|---|
| WO | 2011101691 A1 | 8/2011 |
| WO | 2011132181 A1 | 10/2011 |
| WO | 2013093653 A1 | 6/2013 |

OTHER PUBLICATIONS

Barham, et al., "Xen and the Art of Virtualization," 2003, 14 Pages, ACM, Cambridge, United Kingdom.

Beloglazov, et al., "A Taxonomy and Survey of Energy-Efficient Data Centers and Cloud Computing Systems," 2011, Advances in Computers, 2011, pp. 47-111, vol. 82, Elsevier Inc., Australia.

Bianzino, et al., "A Survey of Green Networking Research," 2010, 18 Pages, Institut TELECOM, Paris, France.

Jin, "Open Networking Infrastructure: Boosting Wireless Networks in the Era of Cloud," 2012, 25 Pages, College of Computer and Information Science, Northeastern University, Boston, Massachusetts.

Wang, et al., "AMES-Cloud: A Framework of Adaptive Mobile Video Streaming and Efficient Social Video Sharing in the Clouds," IEEE Transactions on Multimedia, 2013, 21 Pages, IEEE.

* cited by examiner

CENTRALIZED RADIO ACCESS NETWORK VIRTUALIZATION MECHANISM

TECHNICAL FIELD

The subject disclosure generally relates to embodiments for a centralized radio access network (RAN) virtualization mechanism.

BACKGROUND

An exponential growth of wireless communication devices and services has increased demand for a confined set of available wireless resources. In this regard, conventional RAN technologies process wireless communication requests from mobile devices at individual cellular cites without differentiating use of the mobile devices for processing of such requests. Consequently, conventional RAN technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
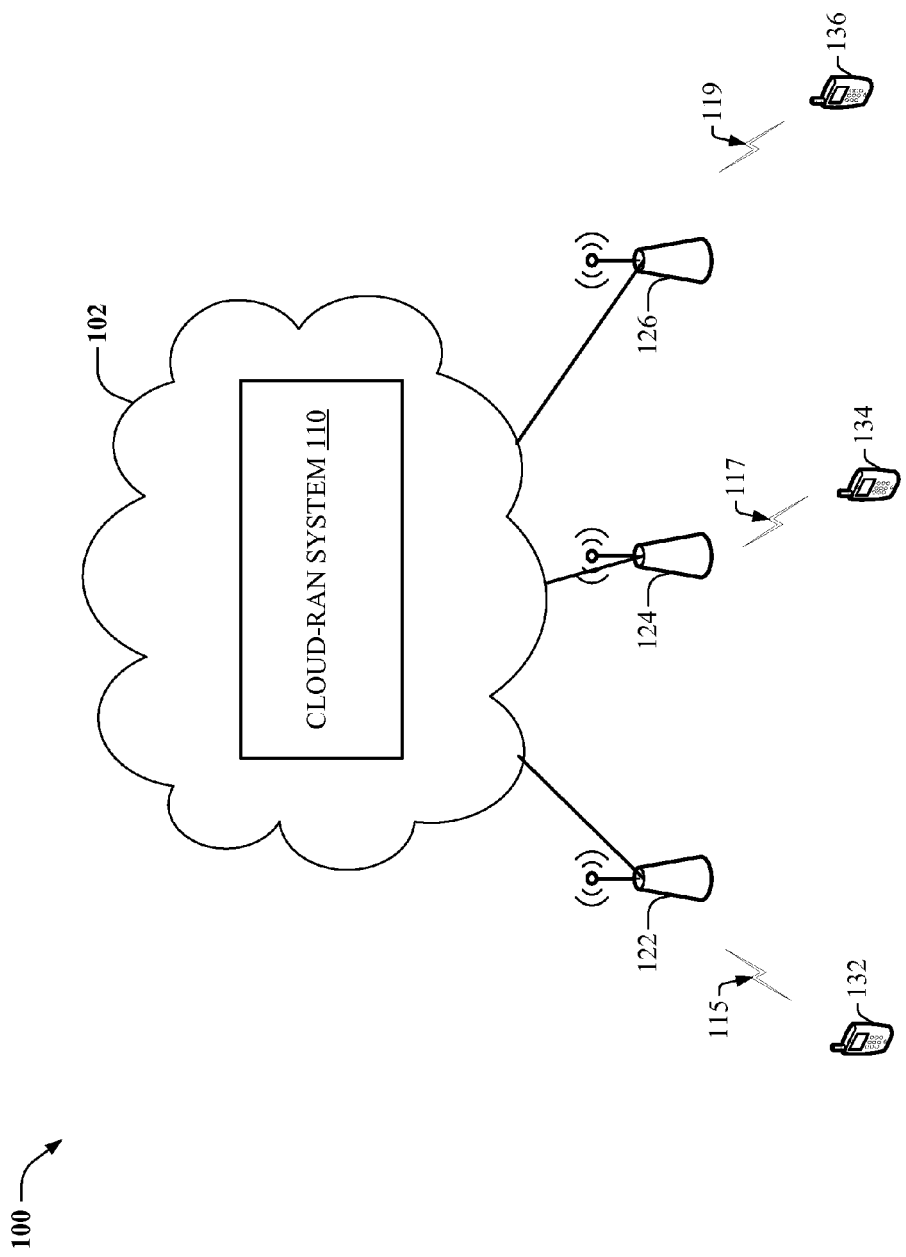
FIG. 1 illustrates a block diagram of a cloud-RAN (C-RAN) virtualization environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional mobile network technologies have had some drawbacks with respect to managing wireless communication requests, including failing to consider use of wireless devices corresponding to such requests. Various embodiments disclosed herein can improve wireless service subscriber experiences and improve use of wireless resources by diverting communication content directed to a wireless device based on a determined state of a display of the wireless device.

For example, a method can include receiving, monitoring, etc., by a system comprising a processor, state information representing a display state of a display of a wireless device, e.g., representing whether a display of an active, powered on, "always on", etc. wireless device has been active, activated, turned on, displaying information, etc.—the active, powered on, always on, etc. wireless device being capable of receiving a wireless communication regardless of the display state, e.g., regardless of whether the display has been active, activated, turned on, displaying information, etc.

Further, the method can include redirecting, by the system, communication content, e.g., multimedia content, video data, picture data, etc. that has been directed to the active, powered on, always on, etc. wireless device to an intermediary device, agent device, virtual wireless device, etc. in response to determining, based on the state information, that the display has been inactive, turned off, not displaying information, etc. for a defined period of time.

In one embodiment, the redirecting can include queuing, storing, etc. the communication content in the intermediary device, agent device, virtual wireless device, etc., e.g., in a memory, storage device, data storage device, first in, first out (FIFO) memory device, etc. of such device as stored content. Further, the method can include sending, by the system via the intermediary device, the stored content directed to the active, powered on, always on, etc. wireless device in response to determining, based on the state information, that the display has been active, activated, turned on, displaying information, etc.

In another embodiment, the redirecting can include compressing the communication content as compressed data, and storing the compressed data in the intermediary device, agent device, virtual wireless device, etc. Further, the method can include sending, by the system via the intermediary device, the compressed data directed to the active, powered on, always on, etc. wireless device in response to determining, based on the state information, that the display has been active, turned on, displaying information, etc.

In yet another embodiment, the redirecting can include receiving, via a virtual wireless device that emulates an operation of the active, powered on, always on, etc. wireless device, e.g., on behalf, as an agent, etc. of such device, the communication content, and storing, via the virtual wireless device, the communication content as stored content. Further, the method can include sending, via the virtual wireless device, the stored content directed to the active, powered on, always on, etc. wireless device in response to determining, based on the state information, that the display has been active, turned on, displaying information, etc.

In an embodiment, the method can include receiving, by the system, network data corresponding to an operating condition of a network device, e.g., an access point (AP), a remote radio head (RRH) of a C-RAN, a gateway (GW), etc. For example, the network data can represent a number of connections, e.g., number of wireless devices, etc. corresponding to, communicating with, etc. the network device. Further, the redirecting can include selecting, based on the network data, a radio access technology (RAT) based on a defined condition with respect to a determined communication bandwidth associated with the network device, e.g., with respect to a determined available bandwidth of the network device. Further, the method can include redirecting the communication content based on the RAT, e.g., sending, by the system, the stored content directed to the wireless device via the RAT; sending, by the system, the stored content directed to the wireless device via selected network device, e.g., including the network device, including an alternate network device, etc.

In one embodiment, a system comprising a processor can include a monitor component that can be configured to determine a display state of a display of a wireless device, e.g., user equipment, cellular phone, smartphone, personal digital assistant, etc. that has been powered on. For example, the display state can represent whether the display of the wireless device has been active, activated, turned on, displaying information, etc. Further, the system can include a virtualization component that can be configured to receive, on behalf of the wireless device via a virtual wireless device, communication content that has been directed to the wireless device in response to determining, based on the display state, that the display has been inactive for a defined period of time.

In another embodiment, the virtualization component can include a queuing component that can be configured to store, via the virtual wireless device, the communication content as stored data, e.g., utilizing a data store, memory, etc. of the virtual wireless device. Further, the virtualization component can include a scheduling component that can be configured to send, via the virtual wireless device, the stored data directed to the wireless device in response to determining, based on the display state, that the display has been active, activated, turned on, displaying information, etc.

In yet another embodiment, the queuing component can include a compression component that can be configured to compress the communication content as compressed data. In this regard, the queuing component can be configured to store, via the virtual wireless device, the compressed data. Further, the scheduling component can be configured to send, via the virtual wireless device, the compressed data directed to the wireless device in response to determining, based on the display state, that the display has been active, activated, turned on, displaying information, etc.

In one embodiment, the monitor component can determine, via a processing device of a set of distributed processing devices, e.g., via a base band unit (BBU) of a scheduling BBU pool of a C-RAN, according to a geographical location, e.g., based on a postal zip code, corresponding to a request associated with the communication content, the display state of the wireless device. In one embodiment, the virtualization component can receive, based on the geographical location corresponding to the request, e.g., via a processing device of a set of distributed virtual wireless devices, the communication content that has been directed to the wireless device, e.g., the processing device including the virtual wireless device. Further, the virtualization component can store, via the processing device of the set of distributed virtual wireless devices based on the geographical location, the communication content as stored data. In another embodiment, in response to determining, based on the display state, that the display has been active, the virtualization component can send, via the processing device of the set of distributed virtual wireless devices based on the geographical location, the stored data directed to the wireless device. In this regard, the system can partition, assign, distribute, etc. monitoring and/or management of resources within a RAN virtualization mechanism.

Another embodiment can include a computer-readable storage medium having stored thereon computer executable instructions that, in response to execution, cause a computing device including a processor to perform operations, the operations comprising: monitoring a state of a display of a wireless device; and in response to determining, based on the state of the display, that the display has been inactive for a defined time period, queuing, via a virtual wireless device, communication content directed to the wireless device.

In one embodiment, the operations can include sending, via the virtual wireless device, the communication content directed to the wireless device in response to determining, based on the state of the display, that the display has been activated. In an embodiment, the operations the queuing of the communication content can include compressing the communication content as compressed data, and storing the compressed data. In another embodiment, the operations can include sending, via the virtual wireless device, the compressed data directed to the wireless device in response to determining, based on the state of the display, that the display has been activated.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) can be utilized in supporting a virtualized computing environment, virtualized device, etc. The virtualized computing environment can support virtual machine(s) representing computer(s), server(s), or other computing device(s). In such virtualized machine(s), component(s) such as processor(s) and/or a storage device(s) may be virtualized or logically represented. Further, the processor(s) can include distributed processing devices, or parallel processing devices, in a single machine, device, etc., or across multiple machines, devices, etc. Furthermore, the processor(s) can include a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by C-RAN system 110 (see below), including but not limited to redirecting communication content that has been directed to a wireless device to an intermediary device in response to determining, based on state information representing a display state of a display of the wireless device, that the display has been inactive for a defined period of time.

A classifier can be a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., C-RAN system 110 (see below), to automatically determine, via monitor component 210 (see below), a display state of a display of a wireless device that has been powered on. Further, the classifier(s) can be used by the artificial intelligence system to automatically receive, intercept, etc., via virtualization component 220 (see below) on behalf of the wireless device via a virtual wireless device, communication content that has been directed to the wireless device in response to determining, based on the display state, that the display of the wireless device has been inactive for a defined period of time. Furthermore, the artificial intelligence system can automatically send, via the virtual wireless device and virtualization component 220 (see below), the received data directed to the wireless device in response to determining, based on the display state, that display of the wireless device has been active.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Aspects, features, and/or advantages of the disclosed subject matter can be exploited in substantially any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (GPRS); third generation partnership project (3GPP) long term evolution (LTE); third generation partnership project 2 (3GPP2); ultra mobile broadband (UMB); 3GPP universal mobile telecommunication system (UMTS); high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can include second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

Moreover, terms like "user equipment" (UE), "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., C-RAN 102 corresponding to a C-RAN virtualization environment (see e.g., 100, 500, etc.), for systems, methods, and/or apparatus disclosed herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of the communication network can include any suitable data packet-switched or combination data packet/circuit-switched communication network, wired or wireless IP network such as a VoLTE network, a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a wireless system e.g., a wireless communication device, UE, etc. (see e.g., 132, 134, 136, etc.) for systems, methods, and/or apparatus disclosed herein can include a mobile device, a mobile phone, a 4G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, or like devices or combinations thereof.

To provide support for C-RAN system 110, the communication network can include a gateway routing component (not shown) that can include any suitable component that can perform centralized routing within a mobile, satellite, or similar network (but optionally need not include components that route strictly within a PSTN network), routing between communication networks, between networks of varying architecture (e.g., between PSTN, GSM, UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such system(s), device(s), etc. can include any suitable device, process, and/or combination device that can store digital and/or switched information (e.g., server, data store component, or the like).

With an increase in demand for wireless services, conventional mobile network technologies have has some drawbacks with respect to efficiently utilizing a limited amount of wireless spectrum. On the other hand, various embodiments disclosed herein can optimize use of an available wireless spectrum based on a determined use of a wireless device. In this regard, and now referring to FIGS. 1 to 5, C-RAN system 110 provides a C-RAN virtualization mechanism that can divert, intercept, etc. communication content directed to a wireless device based on a determined state of a display of the wireless device—conserving wireless spectrum corresponding to the communication content until the display of the wireless device has been determined to be activated.

Figure 2:
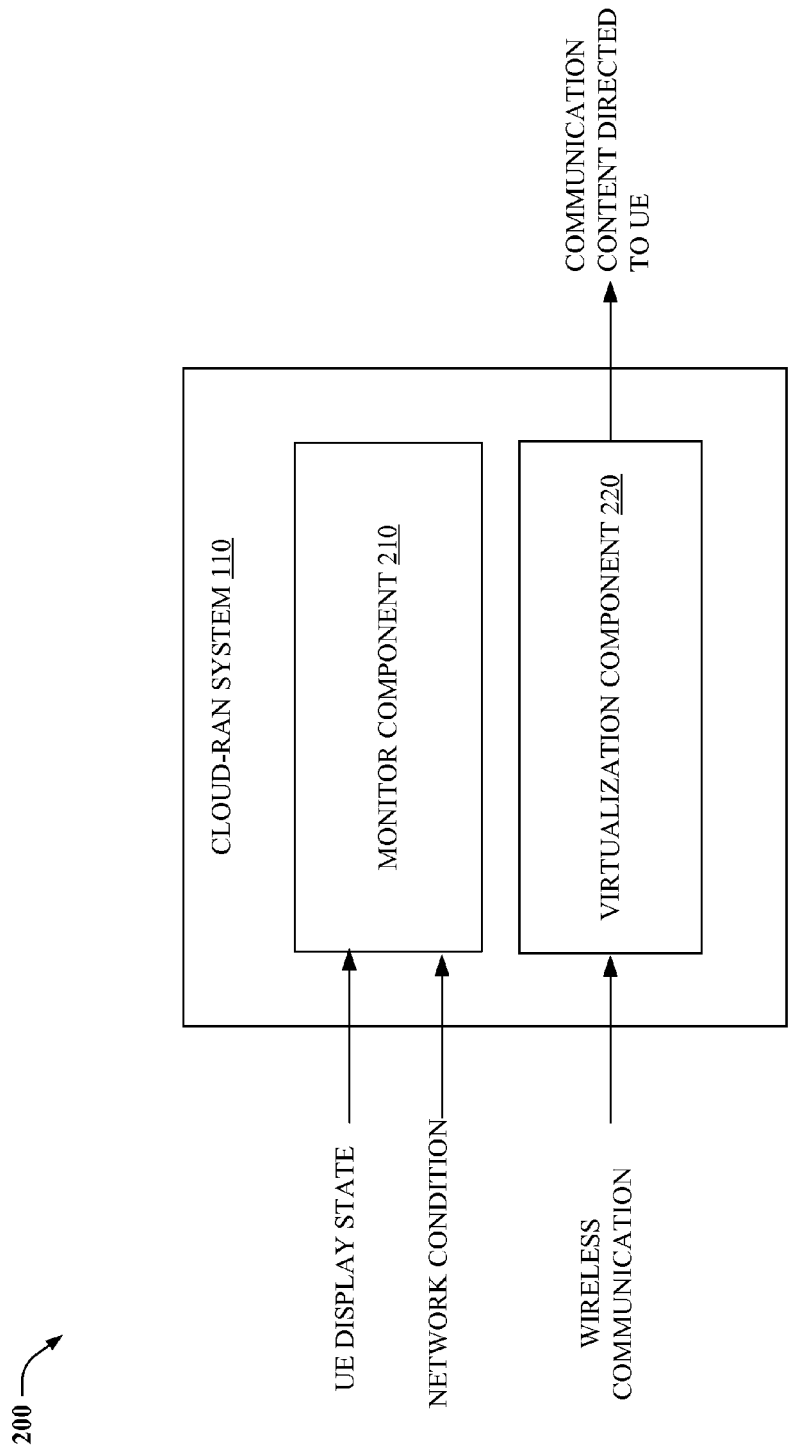
FIG. 2 illustrates a block diagram of a C-RAN system, in accordance with various embodiments.

Now referring to FIGS. 1 and 2, C-RAN virtualization environment 100 and C-RAN system 110 are illustrated, respectively, in accordance with various embodiments. In various aspects, C-RAN system 110 of C-RAN 102 can be wirelessly coupled to an active, powered on, "always on", etc. wireless communication device, UE, etc. (see e.g., 132, 134, 136, etc.) via a wireless link (see e.g., 115, 117, 119, etc.). The wireless link can be an over-the-air wireless link comprising a downlink (DL) and an uplink (UL) (both not shown) that can utilize a predetermined band of radio frequency (RF) spectrum associated with, e.g., cellular, LTE, LTE-A, GSM, 3GPP UMTS, Wi-Fi, WiMax, wireless local area networks (WLAN), Femto, etc. Accordingly, the active, powered on, always on, etc. wireless communication device can be associated with such predetermined RF spectrum.

C-RAN 102 can include software and/or hardware configured to provide connectivity between C-RAN system 110 and the wireless communication device. In this regard, C-RAN virtualization environment 100 and/or C-RAN virtualization environment 500 (see below) can include one or more: macro, Femto, or pico access points (APs) (not shown); base stations (BS) (not shown); landline networks (e.g., optical landline networks, electrical landline networks) (not shown) communicatively coupled between C-RAN system 110 and the wireless communication device. In various embodiments, C-RAN system 110 can communicate via any number of various types of wireless technologies including, but not limited to, cellular, Wi-Fi, WiMax, wireless local area networks (WLAN), Femto, etc. In corresponding embodiments, C-RAN 102 can provide cellular, Wi-Fi, WiMAX, WLAN, and/or other technologies for facilitating such communication. Further, C-RAN 102 can include one or more of the Internet (or another communication network (e.g., IP-based network)), or a digital subscriber line (DSL)-type or broadband network facilitated by Ethernet or other technology. In this regard, C-RAN system 110 can include a cloud-based communication platform, Internet platform, wide area network, etc.

As illustrated by FIG. 1, C-RAN system 110 can include a centralized, cloud computing based RAN, cellular network, etc. that can support a combination of 2G, 3G, 4G, etc. evolution of radio access technology wireless standards, Wi-Fi, etc. In this regard, C-RAN system 110 can be communicatively coupled, via baseband units (BBUs) (not shown), to remote radio heads (RRHs) (e.g., 122, 124, 126, etc.) via digital (optical) signaling. The RRHs can operate as "bare bones" wireless transceivers that can transmit wireless communication signals based on digital signals received from the BBUs, and can convert received wireless communication signals into digital signaling that can be transmitted to the BBUs—the BBUs implementing media access control (MAC) physical layer (PHY) and antenna array system (AAS) functionality away from the bar bones wireless transceivers.

As illustrated by FIG. 2, C-RAN system 110 can include monitor component 210, which can receive, e.g., from the wireless communication device via a remote radio head (RRH) (e.g., 122, 124, 126, etc.), information representing a UE display state of a display of the wireless communication device. In this regard, C-RAN system 110 can determine whether the display of the wireless communication device has been active, activated, turned on, displaying information, etc. Further, C-RAN system 110 can include virtualization component 220, which can receive, intercept, etc., on behalf of the wireless communication device via a virtual wireless device (see e.g., 520, 522, 524, 526 below) wireless communication content that has been directed to the wireless communication device in response to determining, based on the UE display state, that the display has been inactive, deactivated, turned off, not displaying information, etc. for a defined period of time. In this regard, the virtual wireless device can act as an "agent" of the wireless communication device by receiving the wireless communication content from a sender device, e.g., corresponding to a sender who initiated the wireless communication content, and communicating with the sender device, e.g., mimicking the wireless communication device by sending acknowledgment communications to the sender device for, e.g., confirming receipt of portion(s) the wireless communication content.

Figure 3:
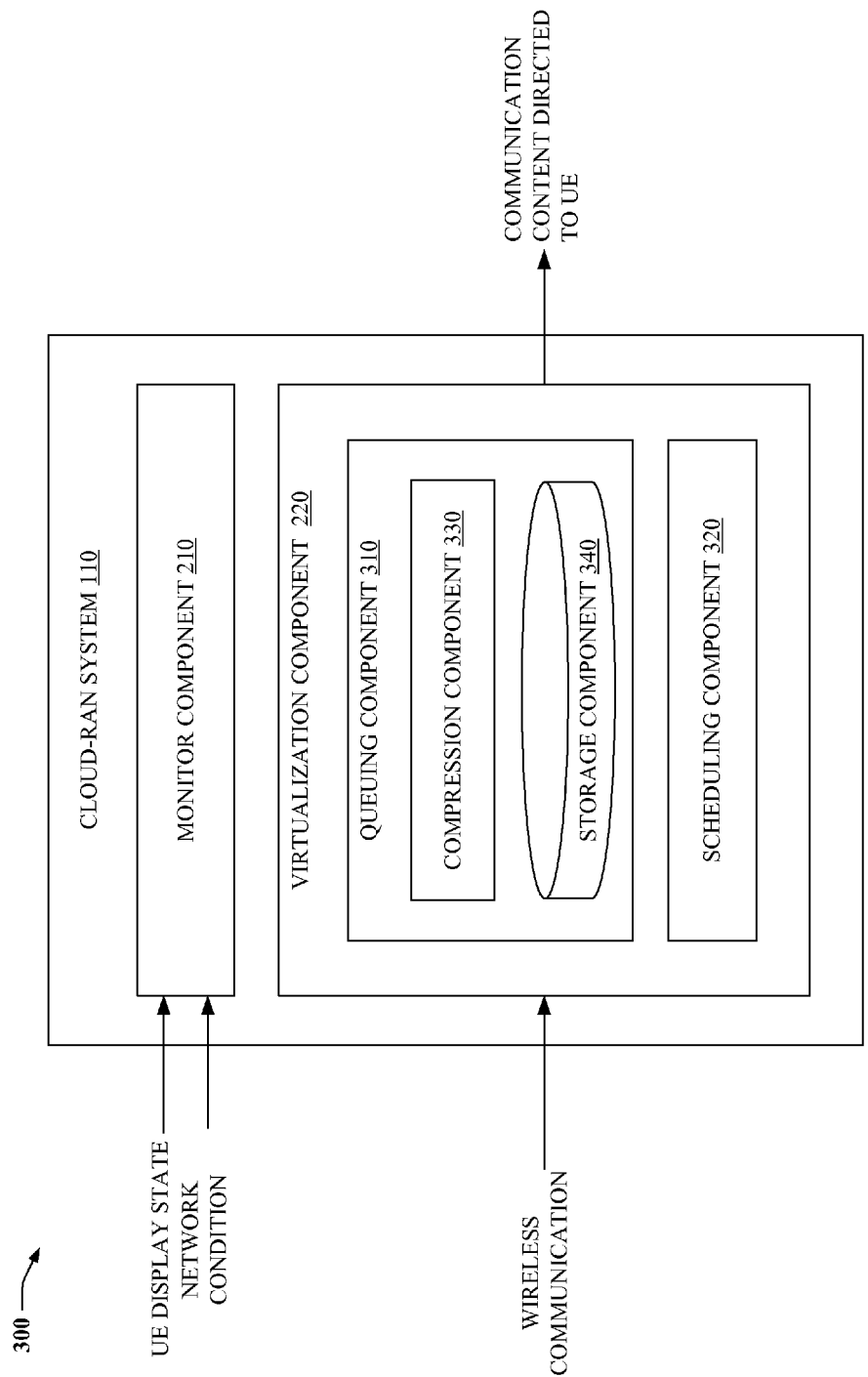
FIG. 3 illustrates a block diagram of another C-RAN system, in accordance with various embodiments.

In an embodiment illustrated by FIG. 3, virtualization component 220 can further include queuing component 310, which can store, via the virtual wireless device, the communication content as stored data, stored communication content, etc. in storage component 340, e.g., a data store, storage medium, memory, etc. Further, virtualization component 220 can include scheduling component 320, which can send, via the virtual wireless device, the stored data, stored communication content, etc. directed to the wireless device in response to determining, based on the UE display state, that the display has been active, activated, turned on, displaying information, etc.

In one embodiment, queuing component 310 can further include compression component 330, which can be configured to compress the communication content as compressed data, compressed communication content, etc. In this regard, queuing component 310 can be configured to store, via the virtual wireless device, the compressed data, compressed communication content, etc. utilizing storage component 340. Further, scheduling component 320 can be configured to send, via the virtual wireless device, the compressed data, compressed communication content, etc. directed to the wireless device in response to determining, based on the UE display state, that the display has been active, activated, turned on, displaying information, etc. In one embodiment, scheduling component 320 can be configured to send compression information directed to the wireless device that can be used by the wireless device to decompress the compressed communication content.

Figure 4:
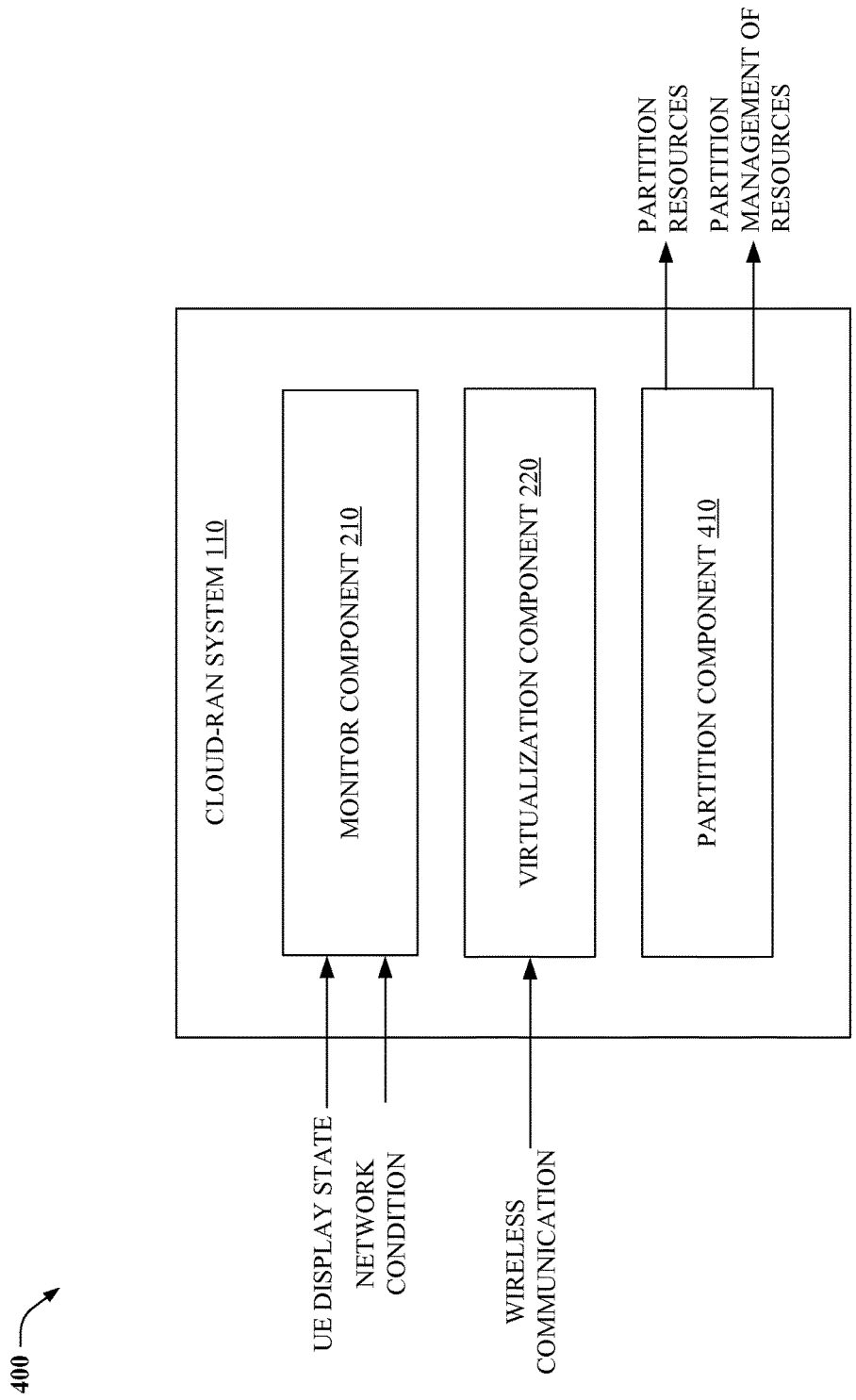
FIG. 4 illustrates a block diagram of a C-RAN system including a partition component, in accordance with various embodiments.

Referring now to FIG. 4, C-RAN system 110 can include partition component 410, which can be configured to receive, via monitor component 210, network data corresponding to an operating condition, network condition, etc. of a network device associated with C-RAN 102, e.g., an AP, an RRH, a GW, etc. For example, the network data can represent a number of connections, e.g., number of UEs, etc. corresponding to, communicating with, etc. the network device. Further, partition component 410 can be configured to partition, assign, etc. resources, management of the resources, and/or operations to be performed on the resources within C-RAN virtualization environment 100, 500, etc., e.g., based on the network data.

For example, in one embodiment, partition component 410 can select, based on the network data, a radio access technology (RAT) based on a defined condition with respect to a determined communication bandwidth associated with the network device, e.g., with respect to a determined available bandwidth of the network device. Further, partition component can select the RAT for redirection of the communication content to the wireless device.

Figure 5:
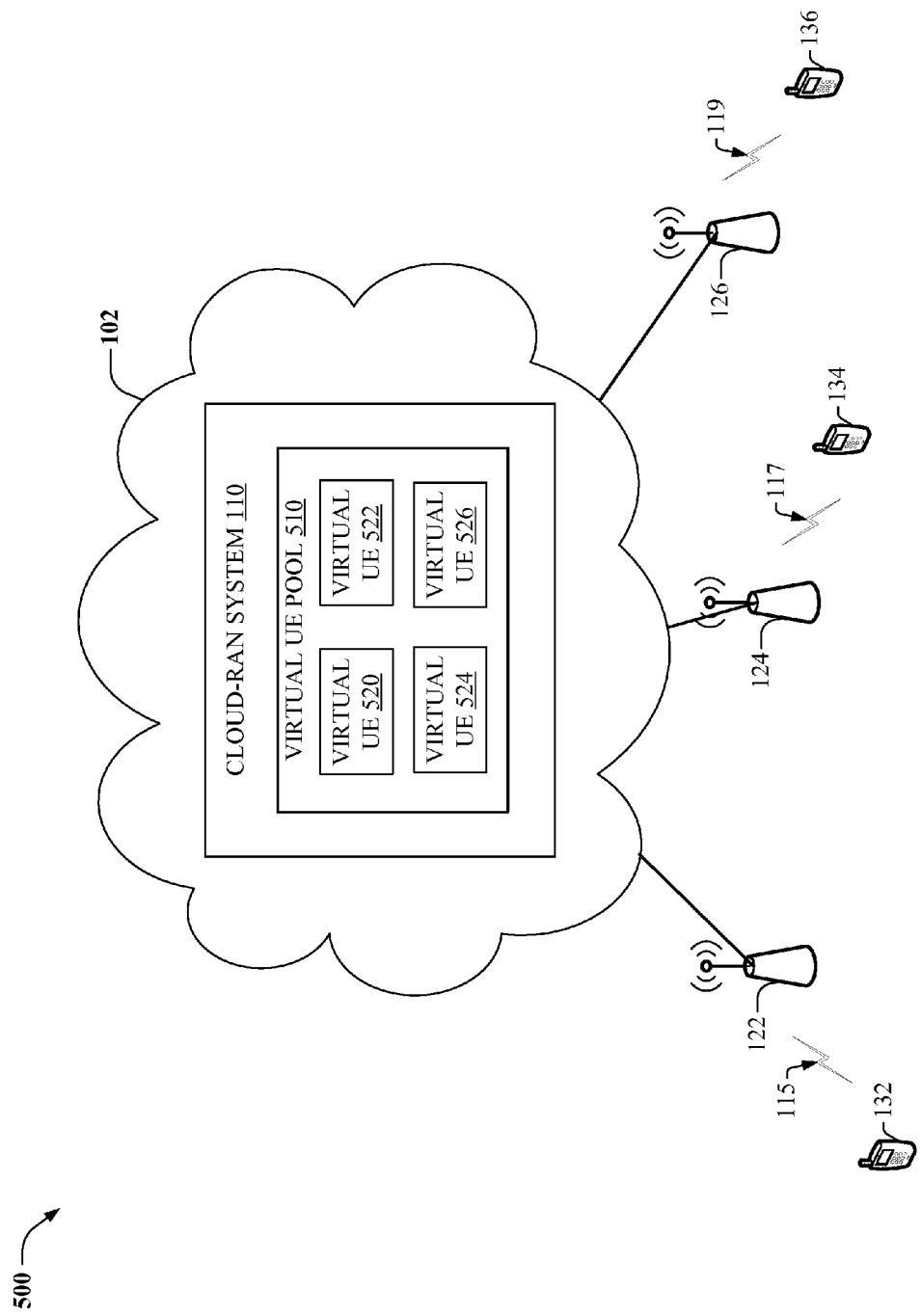
FIG. 5 illustrates a block diagram of a C-RAN virtualization environment including a virtual user equipment (UE) pool, in accordance with various embodiments.
Figure 6:
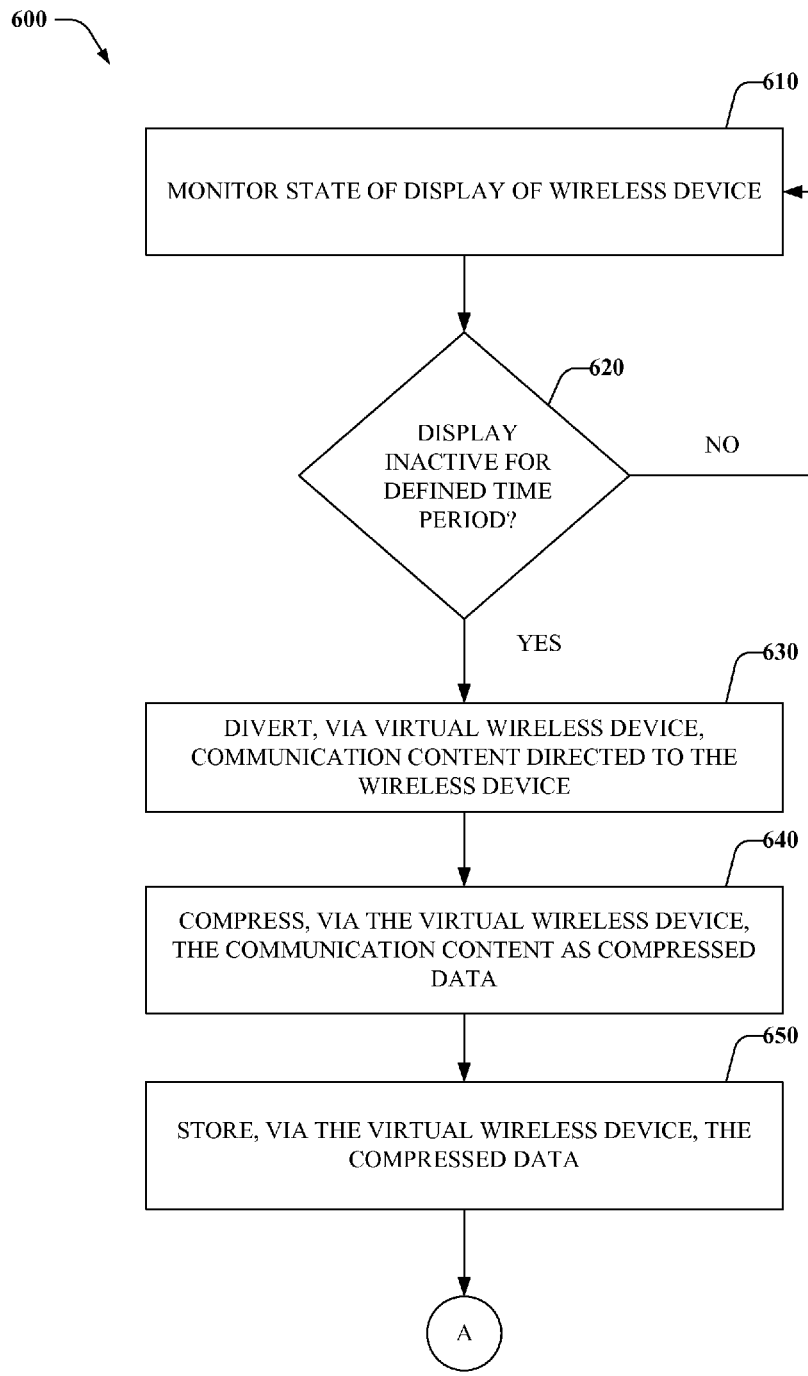
FIGS. 6-12 illustrate flowcharts of methods associated with a C-RAN virtualization environment, in accordance with various embodiments.
Figure 7:
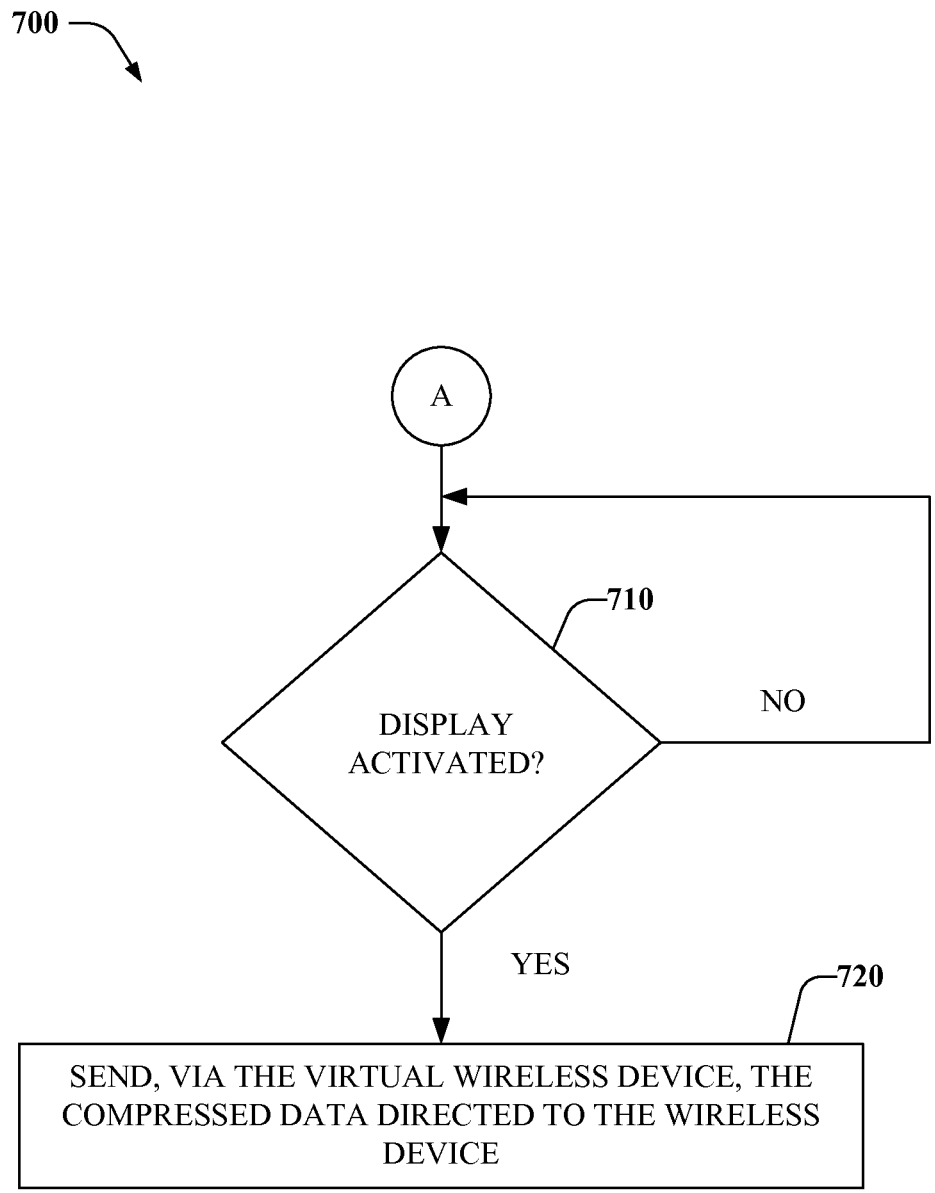

In other embodiment(s) illustrated by FIG. 5, partition component 410 can hierarchically partition, distribute, assign, etc. resources, e.g., within virtual UE pool 510, e.g., a scheduling BBU pool of C-RAN virtualization environment 500, etc. including distributed virtual wireless devices, e.g., virtual UEs (e.g., 520, 522, 524, 526, etc.), based on a geographical location, e.g., postal zip code, corresponding to such resources, e.g., corresponding to a communication request, wireless communication, etc. directed to the wireless device, e.g., 132, 134, 136, etc., and/or corresponding to a location of the wireless device, etc. In this regard, in one embodiment, monitor component 210 can determine, via a virtual UE located within a geographical location, boundary, etc. of the wireless device, e.g., via a virtual UE that has been in communication with the wireless device, etc. the display state of the display of the wireless device. Further, virtualization component 220 can receive, intercept, etc., via the virtual UE, communication content that has been directed to the wireless device in response to determining, based on the display state, that the display has been inactive, deactivated, turned off, not displaying information, etc. for a defined period of time. In turn, virtualization component 220 can send, via the virtual UE, the communication content that has been received, intercepted, etc. to, directed to, etc. the wireless device in response to determining, based on the display state, that the display has been active, activated, turned on, displaying information, etc.

FIGS. 6-12 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 6-12, processes 600 to 1200 performed by C-RAN system 110 are illustrated, in accordance with various embodiments. In embodiment(s) illustrated by FIGS. 6 and 7, at 610, a state of a display of, e.g., an active, powered on, always on, etc. wireless device can be monitored. At 620, it can be determined, based on the state, whether the display has been inactive, turned off, not displaying information, etc. for a defined time period, period of time, etc. In response to determining that the display has been inactive, etc. for the defined period of time, flow continues to 630, at which communication content directed to the wireless device can be diverted, queued, etc. via a virtual wireless device; otherwise flow returns to 610.

At 640, the communication content can be compressed, via the virtual wireless device, as compressed data. At 650, the compressed data can be stored, via the virtual wireless device, in a data store, data storage device, FIFO, etc.

At 710, it can be determined, based on the state, whether the display has been active, activated, turned on, displaying information, etc. In response to determining that the display has been active, etc., flow continues to 720, at which the compressed data can be sent, via the virtual wireless device, to, directed to, etc. the wireless device; otherwise flow returns to 710. In one embodiment, compression information can additionally be sent, via the virtual wireless device, to, directed to, etc. the wireless device, e.g., enabling the wireless device to decompress compressed data received from the virtual wireless device.

Figure 8:
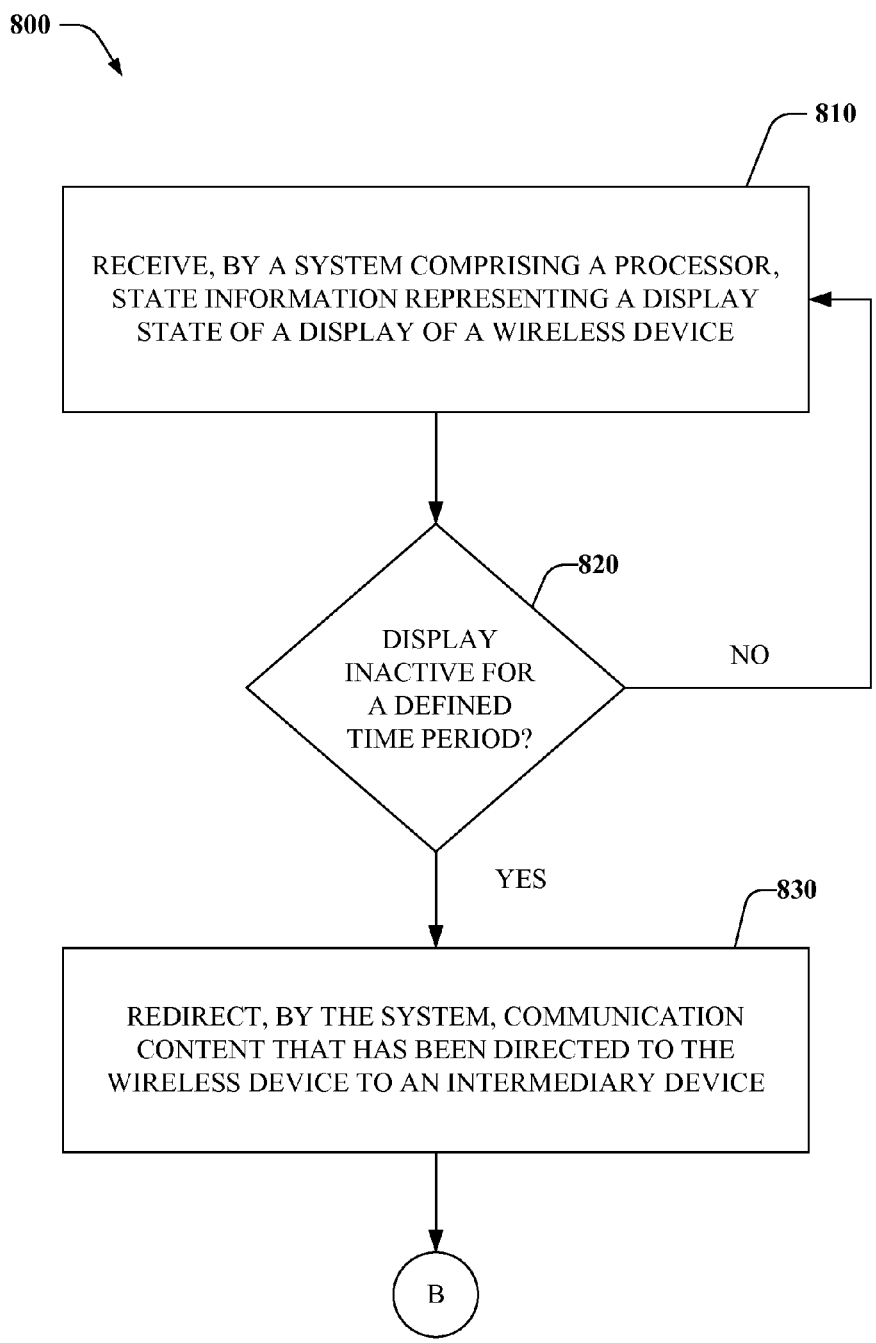
Figure 9:
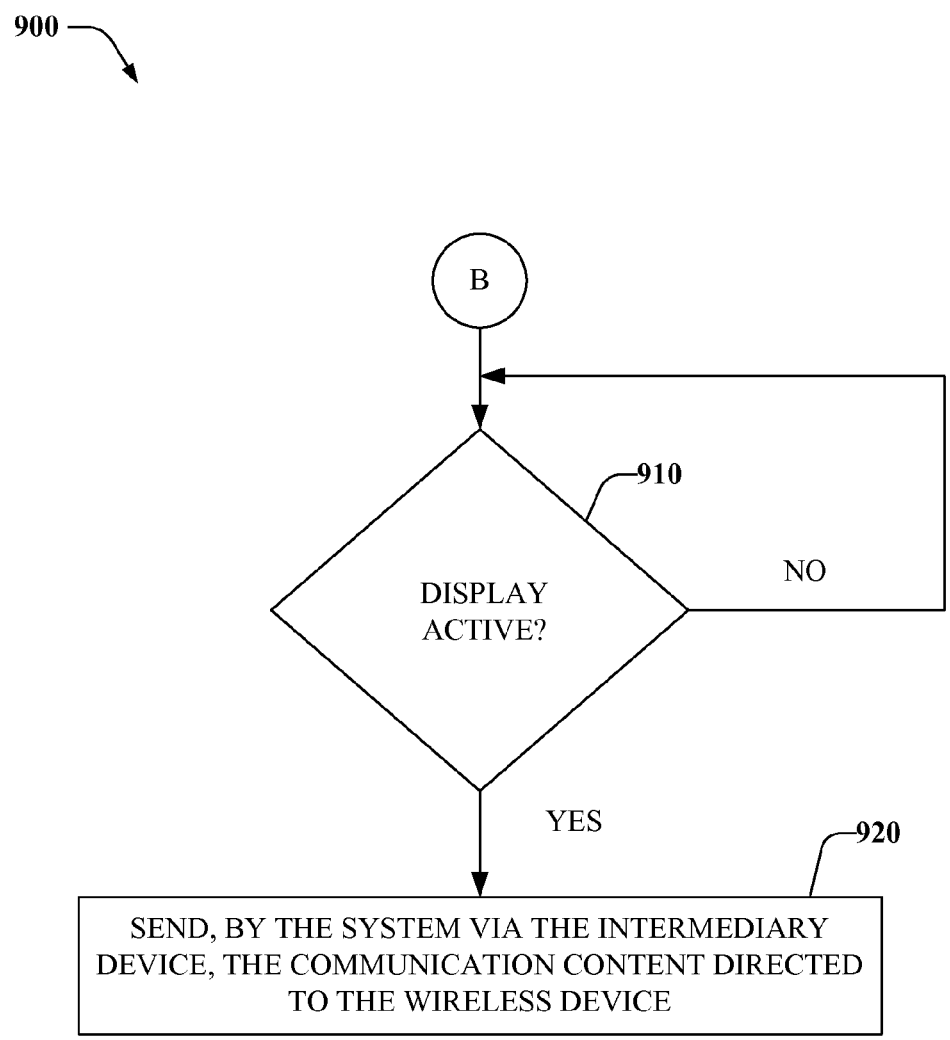

In embodiment(s) illustrated by FIGS. 8 and 9, at 810, state information representing a display state of a display of a wireless device can be received by a system, e.g., C-RAN system 110. At 820, it can be determined, based on the state information, whether the display has been inactive, turned off, not displaying information, etc. for a defined time period, period of time, etc. In response to determining that the display has been inactive, etc. for the defined period of time, flow continues to 830, at which the system can redirect communication content that has been directed to the wireless device to an intermediary device, agent device, virtual UE, etc.; otherwise flow returns to 810.

In one embodiment, the redirection of the communication content can include storing, by the system, the communication content in the intermediary device as stored content. In another embodiment, the redirection of the communication content can include compressing the communication content as compressed data, and storing the compressed data in the intermediary device as the stored content.

At 910, it can be determined, based on the state information, whether the display has been active, turned on, displaying information, etc. In response to determining that the display has been active, etc., flow continues to 920, at which the communication content, stored communication content, compressed data, etc. can be sent by the system, via the intermediary device, directed to the wireless device; otherwise flow returns to 910.

Figure 10:
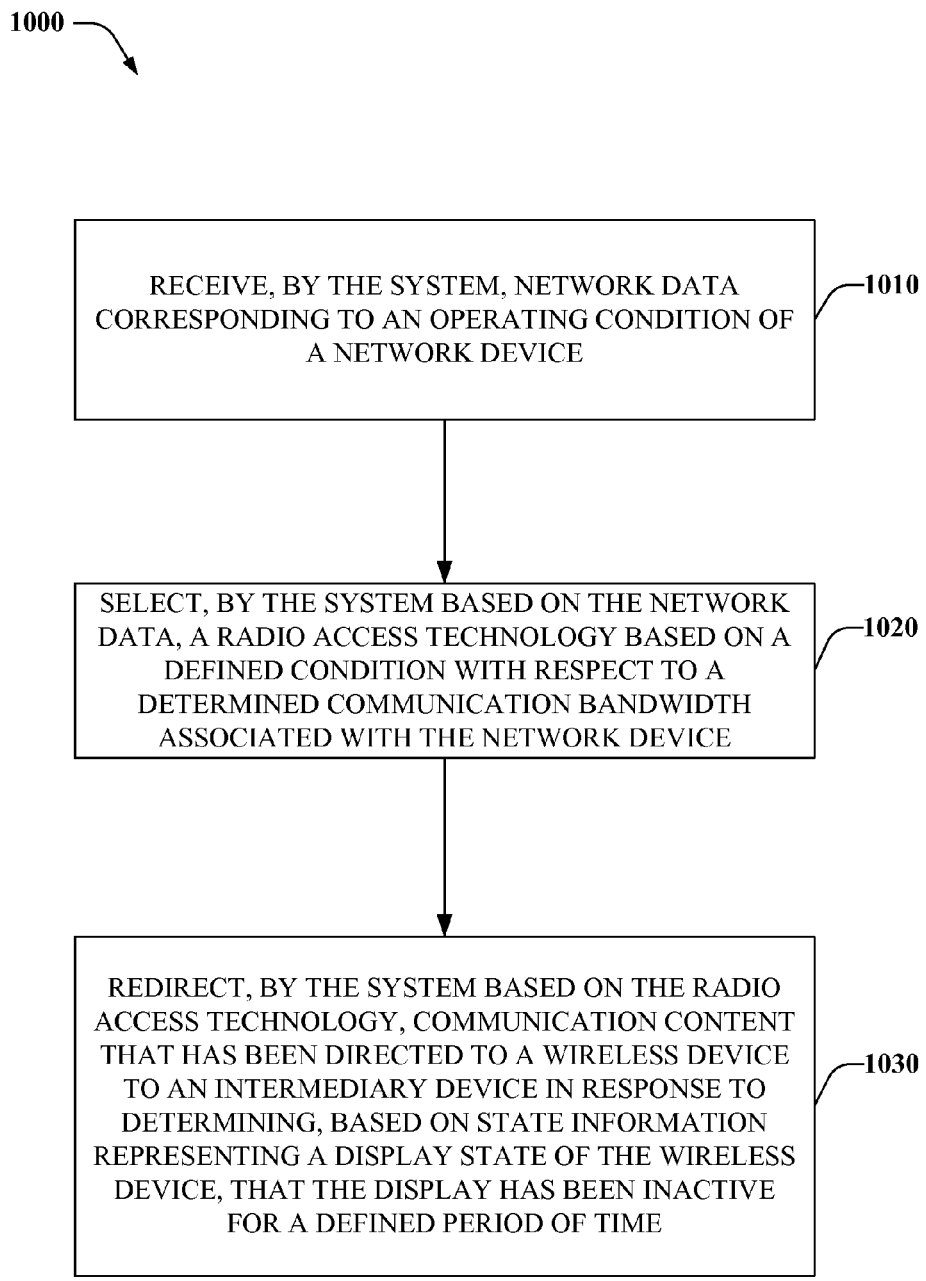

In embodiment(s) illustrated by FIG. 10, at 1010, network data corresponding to an operating condition, network condition, etc. of a network device, e.g., AP, RRH, GW, etc. of C-RAN virtualization environment 100, 500, etc. can be received by the system at 1010. For example, the network data can represent a number of connections, e.g., number of wireless devices, etc. corresponding to, communicating with, etc. the network device.

At 1020, the system can select, based on the network data and a defined condition with respect to a determined communication bandwidth associated with the network device, e.g., with respect to a determined available bandwidth of the network device, a radio access technology (RAT).

At 1030, the system can redirect, divert, etc., based on the RAT, communication content that has been directed to a wireless device to an intermediary device in response to determining, based on state information representing a display state of the wireless device, that the display has been inactive for a defined period of time. In another embodiment, the system can send, via the intermediary device via the RAT, the redirected communication content directed to the wireless device in response to determining, based on the state information, that the display has been active, etc.

Figure 11:
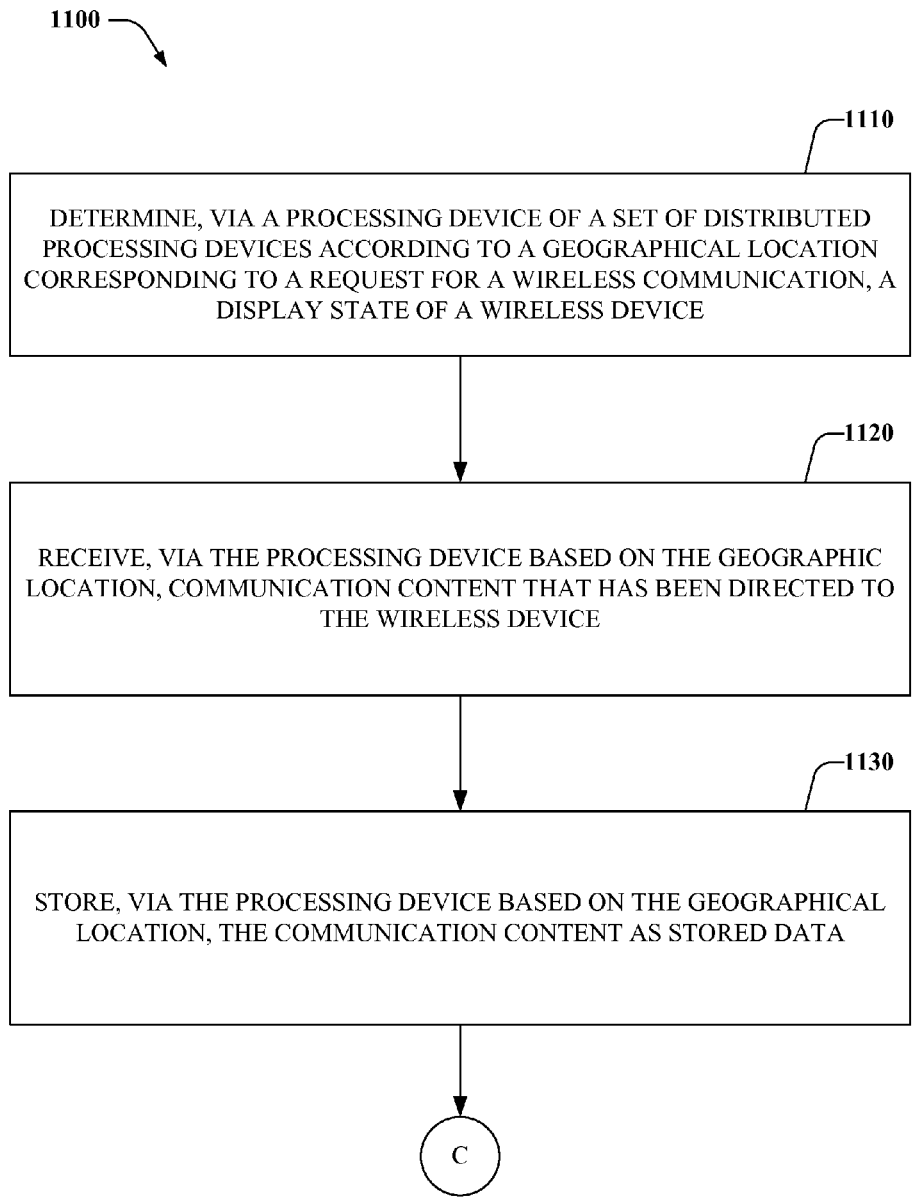
Figure 12:
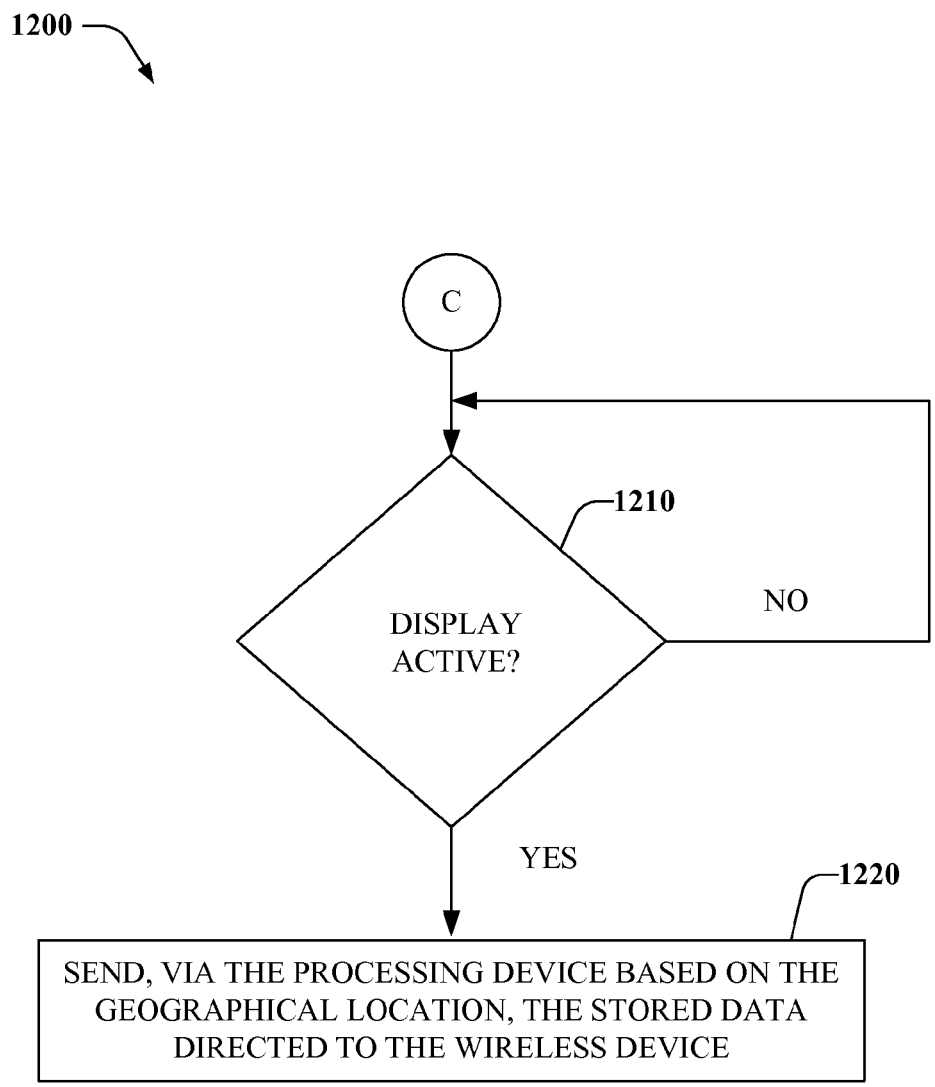

Referring to embodiment(s) illustrated by FIGS. 11 and 12, at 1110, a display state of a wireless device can be determined via a processing device of a set of distributed processing devices, e.g., via a BBU of a scheduling BBU pool of a C-RAN, according to a geographical location, e.g., based on a postal zip code, corresponding to a request for a wireless communication including communication content that has been directed to the wireless device. At 1120, the communication content can be received via the processing device based on the geographical location. At 1130, the communication content can be stored via the processing device based on the geographical location as stored data. In this regard, in an embodiment, the communication content can be received and/or stored regardless of the display state of the wireless device. In another embodiment, the communication content can be received and/or stored in response to the processing device determining that the display has been inactive for a defined period of time.

At 1210, it can be determined, e.g., via the processing device based on the display state, whether the display has been active, etc. In response to determining that the display has been active, etc., flow continues to 1220, at which the stored data can be sent, via the processing device based on the geographical location, to, directed to, etc. the wireless device.

Figure 13:
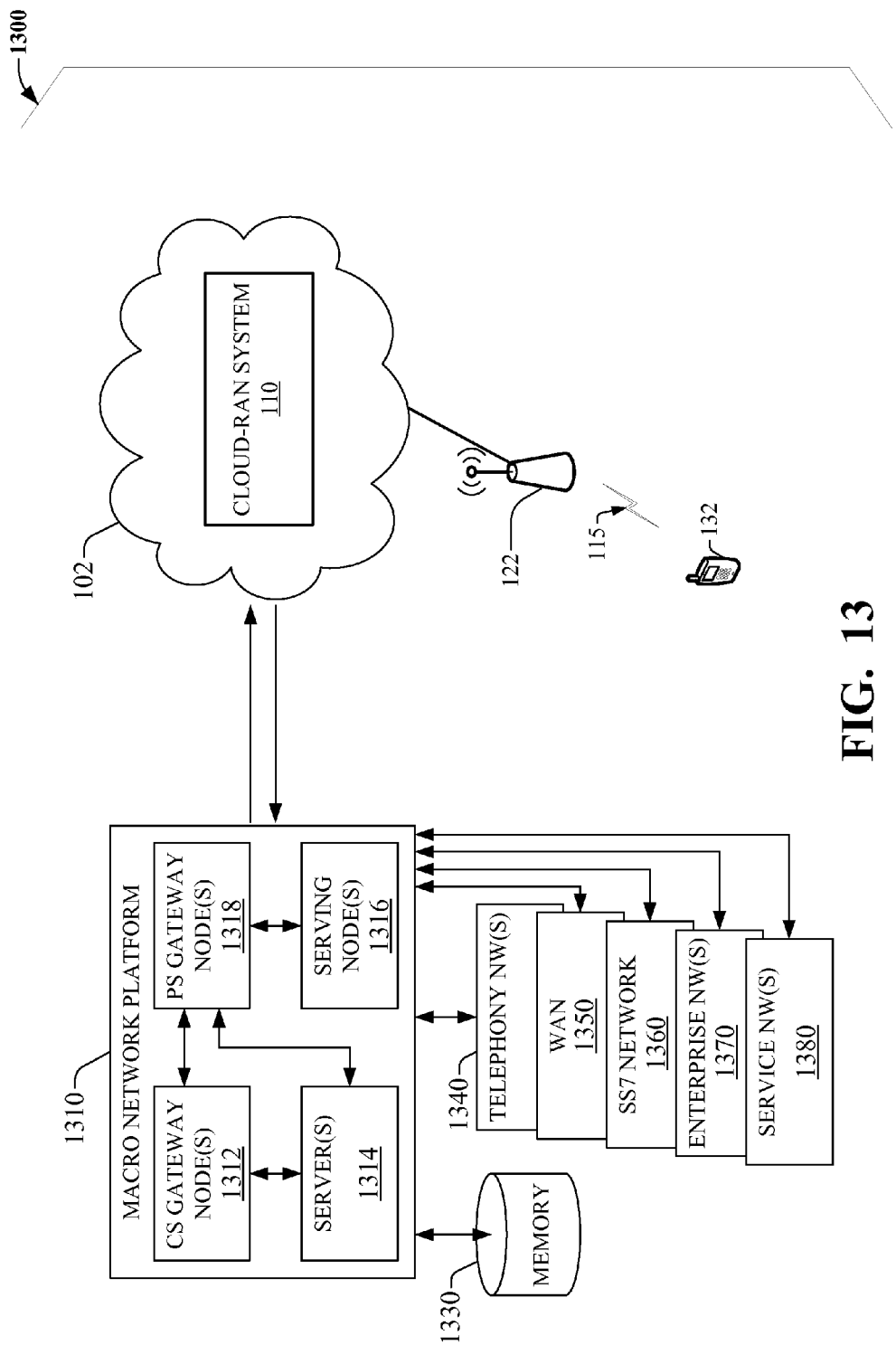
FIG. 13 illustrates a block diagram of a wireless network environment, in accordance various embodiments.

With respect to FIG. 13, a wireless communication environment 1300 including macro network platform 1310 is illustrated, in accordance with various embodiments. Macro network platform 1310 serves or facilitates communication with a wireless device, e.g., 132, 134, 136, etc. via C-RAN 102. C-RAN 102 can include base station(s), base transceiver station(s), access point(s), etc. and associated electronic circuitry and deployment site(s), in addition to a wireless radio link operated in accordance with the base station(s), etc. Accordingly, C-RAN 102 can comprise various coverage cells, or wireless coverage areas. In addition, it should be appreciated that elements and/or components of C-RAN system 110 can be located/included within one or more components/elements, e.g., hardware, software, etc., of wireless communication environment 1300, e.g., macro network platform 1310, C-RAN 102, etc.

Generally, macro network platform 1310 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via C-RAN system 110. In various embodiments, macro network platform 1310 includes CS GW node(s) 1312 that can interface CS traffic received from legacy networks like telephony network(s) 1340, e.g., public switched telephone network (PSTN), public land mobile network (PLMN), Signaling System No. 7 (SS7) network 1360, etc. CS GW node(s) 1312 can authorize and authenticate traffic, e.g., voice, arising from such networks. Additionally, CS GW node(s) 1312 can access mobility or roaming data generated through SS7 network 1360; for instance, mobility data stored in a visitor location register (VLR), which can reside in memory 1330. Moreover, CS GW node(s) 1312 interfaces CS-based traffic and signaling with PS GW node(s) 1318. As an example, in a 3GPP UMTS network, PS GW node(s) 1318 can be embodied in GW GPRS support node(s) (GGSN).

As illustrated by FIG. 13, PS GW node(s) 1318 can receive and process CS-switched traffic and signaling via CS GW node(s) 1312. Further PS GW node(s) 1318 can authorize and authenticate PS-based data sessions with served, e.g., via C-RAN 102, wireless devices, e.g., 132, 134, 136, etc. Such data sessions can include traffic exchange with networks external to the macro network platform 1310, like wide area network(s) (WANs) 1350; enterprise networks (NWs) 1370, e.g., E911, service NW(s) 1380, e.g., an IP multimedia subsystem (IMS), etc. It should be appreciated that local area network(s) (LANs), which may be a part of enterprise NW(s) 1370, can also be interfaced with macro network platform 1310 through PS GW node(s) 1318. PS GW node(s) 1318 can generate packet data contexts when a data session is established. To that end, in an aspect, PS GW node(s) 1318 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1314. It is to be noted that in 3GPP UMTS network(s), PS GW node(s) 1318 (e.g., GGSN) and tunnel interface (e.g., TTG) comprise a packet data GW (PDG).

Macro network platform 1310 also includes serving node(s) 1316 that can convey the various packetized flows of information, or data streams, received through PS GW node(s) 1318. As an example, in a 3GPP UMTS network, serving node(s) can be embodied in serving GPRS support node(s) (SGSN).

As indicated above, server(s) 1314 in macro network platform 1310 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1310. Data streams can be conveyed to PS GW node(s) 1318 for authorization/authentication and initiation of a data session, and to serving node(s) 1316 for communication thereafter. Server(s) 1314 can also effect security, e.g., implement one or more firewalls, of macro network platform 1310 to ensure network's operation and data integrity in addition to authorization and authentication procedures that CS GW node(s) 1312 and PS GW node(s) 1318 can enact. Moreover, server(s) 1314 can provision services from external network(s), e.g., WAN 1350, or global positioning system (GPS) network(s), which can be a part of enterprise NW(s) 1380. It is to be noted that server(s) 1314 can include one or more processors configured to confer at least in part the functionality of macro network platform 1310. To that end, the one or more processors can execute code instructions stored in memory 1330, for example.

In wireless communication environment 1300, memory 1330 can store information related to operation of macro network platform 1310, e.g., related to operation of C-RAN system 110. The information can include business data associated with subscribers; market plans and strategies, e.g., promotional campaigns, business partnerships, mobile devices served through macro network platform, etc.; service and privacy policies; end-user service logs for law enforcement; term(s) and/or condition(s) associated with wireless service(s) provided via C-RAN 102; and so forth. Memory 1330 can also store information from at least one of telephony network(s) 1340, WAN 1350, SS7 network 1360, enterprise NW(s) 1370, or service NW(s) 1380.

In one or more embodiments, components of core network environment 1300 can provide communication services to the wireless device, e.g., 132, 134, 136, etc. via C-RAN 102 utilizing over-the-air wireless link 115. In this regard, C-RAN 102 can include one or more: macro, Femto, or pico access points (APs) (not shown); base stations (BS) (not shown); landline networks (e.g., optical landline networks, electrical landline networks) (not shown) communicatively coupled between the wireless device, e.g., 132, 134, 136, etc. and macro network platform 1310. Further, over-the-air wireless link 135 can comprise a downlink (DL) and an uplink (UL) (both not shown) that can utilize a predetermined band of radio frequency (RF) spectrum associated with any number of various types of wireless technologies including, but not limited to, cellular, LTE, LTE-A, GSM, 3GPP UMTS, Wi-Fi, WiMax, wireless local area networks (WLAN), Femto, etc.

Core network environment 1300 can include one or more of the Internet (or another communication network (e.g., IP-based network)), or a digital subscriber line (DSL)-type or broadband network facilitated by Ethernet or other technology. In various embodiments, core network environment 1300 can include hardware and/or software for allocating resources to the wireless device, e.g., 132, 134, 136, etc., converting or enforcing protocols, establishing and/or providing levels of quality of service (QoS), providing applications or services, translating signals, and/or performing other desired functions to facilitate system interoperability and communication to/from the wireless device, e.g., 132, 134, 136, etc.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1422 (see below), disk storage 1424 (see below), and/or memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory 1420 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 14:
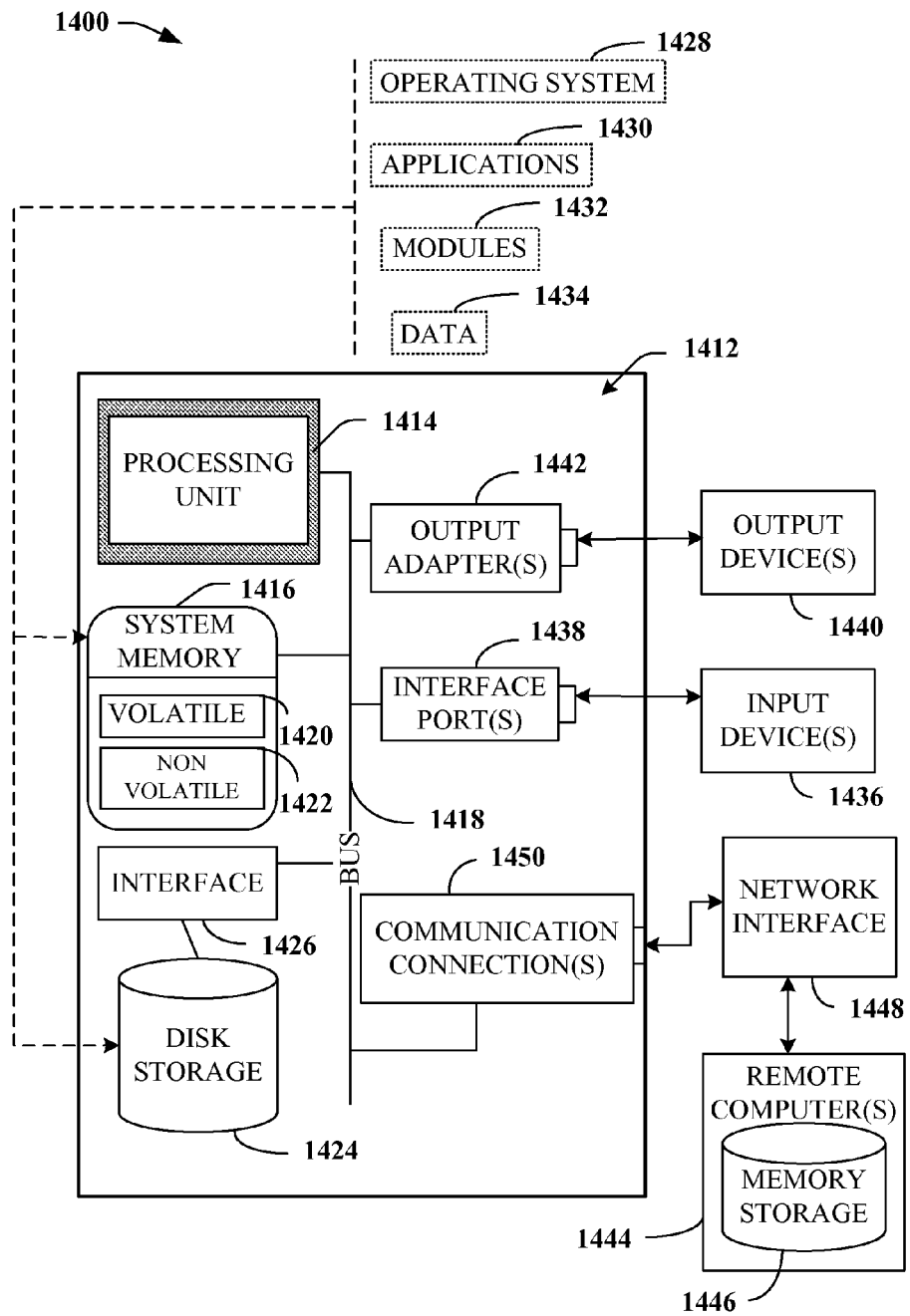
FIG. 14 is a block diagram representing an illustrative non-limiting computing system or operating environment in which one or more aspects of various embodiments described herein can be implemented.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 14, a block diagram of a computing system 1400 operable to execute the disclosed systems and methods is illustrated, in accordance with an embodiment. Computer 1412 includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1416 includes volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

It is to be appreciated that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user can enter commands, e.g., via UI component 510, or information into computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1414 through system bus 1418 via interface port(s) 1438. Interface port(s) 1438 include, for example, a serial port, a parallel port, a game port, a universal serial bus (USB), a wireless based port, e.g., Wi-Fi, Bluetooth, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440, like display devices, light projection devices, monitors, speakers, and printers, among other output devices 1440, which use special adapters. Output adapters 1442 include, by way of illustration and not limitation, video and sound devices, cards, etc. that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically and/or wirelessly connected via communication connection 1450. Network interface 1448 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit switching networks like integrated services digital networks (ISDN) and variations thereon, packet switching networks, and digital subscriber lines (DSL).

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, wireless modems, ISDN adapters, and Ethernet cards.

The computer 1412 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1412 can connect to other devices/networks by way of antenna, port, network interface adaptor, wireless access point, modem, and/or the like.

The computer 1412 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a system comprising a processor via a wireless communication interface coupled to a wireless device, state information representing whether a display of the wireless device has been activated; and
   in response to determining, based on the state information that has been received via the wireless communication interface, that the display has been inactive for a defined period of time,
   intercepting, by the system via a virtual wireless device via a network connection, communication content that has been directed to the wireless device, wherein the virtual wireless device has been selected from a group of geographically distributed virtual wireless devices based on a geographical location of the virtual wireless device being determined to be within a geographical boundary of the wireless device,
   compressing the communication content as compressed data and storing the compressed data in an intermediary device to be subsequently transmitted to the wireless device upon the display being determined to be activated, and
   sending, by the system via the virtual wireless device, an acknowledgement communication signifying the communication content has been received by the wireless device.

2. The method of claim 1, further comprising:
   in response to determining, based on the state information, that the display has been active, sending, by the system, the compressed data directed to the wireless device.

3. The method of claim 2, wherein the sending comprises:
   sending compression information directed to the wireless device to facilitate decompression of the compressed data.

4. The method of claim 1, further comprising:
   receiving, by the system, network data corresponding to an operating condition of a network device.

5. The method of claim 4, wherein the intercepting comprises:
   selecting, based on the network data, a radio access technology based on a defined condition with respect to a determined communication bandwidth associated with the network device; and
   intercepting the communication content based on the radio access technology.

6. The method of claim 4, wherein the receiving the network data comprises receiving information representing a number of wireless devices communicating with the network device.

7. The method of claim 1, further comprising:
   selecting, by the system, the virtual wireless device based on a postal zip code associated with the virtual wireless device being determined to correspond to the geographical location.

8. The method of claim 1, further comprising:
   selecting, by the system, the virtual wireless device from the group of geographically distributed virtual wireless devices based on the virtual wireless device being determined to be located within the geographical boundary of the wireless device.

9. The method of claim 1, wherein the receiving the state information comprises:
   receiving digital signals representing the state information from a remote wireless transceiver wirelessly coupled, via the wireless communication interface, to the wireless device.

10. A system, comprising:
    a processor; and
    a memory that stores executable instructions that, when executed by the processor, facilitate performance of operations, comprising:
    determining, via a communication interface coupled to a wireless device, a display state of a display of the wireless device representing whether the display has been inactive for a period of time; and
    in response to the display being determined to have been inactive for the period of time,
    receiving, on behalf of the wireless device via a virtual wireless device via a network interface, communication content that has been directed to the wireless device, wherein the virtual wireless device has been selected from distributed virtual wireless devices based on a geographical location of the virtual wireless device being determined to be within a geographical boundary corresponding to the wireless device,
    compressing the communication content as compressed content and storing the compressed content in an intermediary device for later transmittal to the wireless device upon a determination that the display has been activated, and
    sending, on behalf of the wireless device via the virtual wireless device, a receipt representing that a portion of the communication content has been received by the wireless device.

11. The system of claim 10, wherein the determining the display state comprises:
    determining, via the virtual wireless device, the display state of the display of the wireless device.

12. The system of claim 11, further comprising:
    storing, via the virtual wireless device, the communication content as stored data.

13. The system of claim 12, wherein the operations further comprise:
    in response to the display being determined to have been active, sending, via the virtual wireless device, the stored data directed to the wireless device.

14. The system of claim 10, wherein the receiving comprises:
   storing, via the virtual wireless device, the communication content as stored data.

15. The system of claim 14, wherein the operations further comprise:
   in response to the display being determined to have been active, sending, via the virtual wireless device, the stored data directed to the wireless device.

16. The system of claim 10, wherein the virtual wireless device has been selected from the distributed virtual wireless devices in response to a determination that a zip code of the virtual wireless device corresponds to the geographical boundary corresponding to the wireless device.

17. A non-transitory machine-readable storage medium, comprising executable instructions that, when executed by a processor, facilitate performance of operations, comprising:
   monitoring, utilizing a wireless access point device coupled to a wireless device, whether a display of the wireless device has been active; and
   in response to determining that the display has been inactive for a defined time period,
      receiving, using a network connection via a virtual wireless device that has been selected from a group of geographically distributed virtual wireless devices based on a location of the virtual wireless device being determined to be within a geographical location corresponding to the wireless device, communication content directed to the wireless device,
      compressing the communication content as compressed data,
      storing the compressed data for later transmission to the wireless device upon detection of an activation of the display of the wireless device, and
      sending, via the virtual wireless device, a message indicating that the wireless device has received the communication content.

18. The non-transitory machine-readable storage medium of claim 17, wherein the operations further comprise:
   in response to determining that the display has been activated, sending, via the virtual wireless device, the communication content directed to the wireless device.

19. The non-transitory machine-readable storage medium of claim 17, wherein the operations further comprise:
   in response to determining that the display has been activated, sending, via the virtual wireless device, the compressed data directed to the wireless device.

20. The non-transitory machine readable storage medium of claim 19, wherein the sending further comprises:
   sending compression information directed to the wireless device to facilitate decompression of the compressed data.

* * * * *